United States Patent
Wendt et al.

(10) Patent No.: US 8,035,313 B2
(45) Date of Patent: Oct. 11, 2011

(54) LIGHT ELEMENT ARRAY WITH CONTROLLABLE CURRENT SOURCES AND METHOD OF OPERATION

(75) Inventors: Matthias Wendt, Eindhoven (NL); Harald Josef Gunther Radermacher, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 373 days.

(21) Appl. No.: 12/443,855

(22) PCT Filed: Sep. 20, 2007

(86) PCT No.: PCT/IB2007/053820
§ 371 (c)(1),
(2), (4) Date: Apr. 1, 2009

(87) PCT Pub. No.: WO2008/041151
PCT Pub. Date: Apr. 10, 2008

(65) Prior Publication Data
US 2010/0072902 A1    Mar. 25, 2010

(30) Foreign Application Priority Data
Oct. 6, 2006 (EP) .................................... 06121889

(51) Int. Cl.
*H05B 39/04* (2006.01)
(52) U.S. Cl. ............... 315/291; 315/169.3; 315/224; 315/302; 315/315
(58) Field of Classification Search .............. 315/169.3, 315/209 R, 210, 224, 246, 291, 302, 306, 315/312–315
See application file for complete search history.

(56) References Cited

U.S. PATENT DOCUMENTS

| | | | |
|---|---|---|---|
| 5,736,881 A | 4/1998 | Ortiz | |
| 5,812,105 A * | 9/1998 | Van de Ven | 345/83 |
| 6,747,617 B1 * | 6/2004 | Kawashima | 345/76 |
| 6,803,732 B2 * | 10/2004 | Kraus et al. | 315/307 |
| 7,023,147 B2 * | 4/2006 | Colby et al. | 315/291 |
| 7,274,151 B2 * | 9/2007 | Wakou et al. | 315/169.3 |
| 7,884,557 B2 * | 2/2011 | Steele et al. | 315/306 |
| 2005/0002188 A1 | 1/2005 | Bucher et al. | |
| 2005/0212459 A1 | 9/2005 | Patel et al. | |
| 2006/0022916 A1 | 2/2006 | Aiello | |

FOREIGN PATENT DOCUMENTS

| | | |
|---|---|---|
| EP | 1318701 A2 | 6/2003 |
| EP | 1320284 A2 | 6/2003 |

* cited by examiner

*Primary Examiner* — Jason M Crawford

(57) ABSTRACT

A light emitting array is described and includes first, second and third light emitting elements, and first and second current sources. The first light emitting element includes first and second terminals, and is characterized by a first operating voltage Vop1 at or above which it is substantially operable to emit light. The second light emitting device includes a first terminal, and a second terminal coupled to the second terminal of the first light emitting element, the second light emitting element characterized by a second operating voltage Vop2 at or above which the second light emitting element is substantially operable to emit light. The third light emitting element includes a first terminal coupled to the first terminal of the first light emitting element, and a second terminal, the third lighting emitting element characterized by a third operating voltage Vop3 at or above which it is substantially operable to emit light. The first current source is coupled between first terminal of the second light emitting element and the first terminal of the second light emitting element, and the second current source is coupled between the second terminal of the first light emitting element and the second terminal of the third light emitting element.

15 Claims, 5 Drawing Sheets

LIGHT ELEMENT ARRAY WITH CONTROLLABLE CURRENT SOURCES AND METHOD OF OPERATION

This application is a national stage application under 35 U.S.C. §371 of International Application No. PCT/IB07/53820 filed on Sep. 20, 2007, which claims priority to European Application No. 06121889.7, filed on Oct. 6, 2006, incorporated herein by reference.

FIELD OF THE INVENTION

The present invention relates generally to arrays of light emitting elements, and more particularly to light emitting arrays employing controllable current sources and methods of operating same.

BACKGROUND OF THE INVENTION

Light emitting elements, such as light emitting diodes (LEDs) enjoy increasing use in a wide range of applications, some examples being back light sources in liquid crystal displays, flashes for charge coupled device cameras, general lighting, as well as other applications. In many of these applications, LEDs of different colors are arranged in an array to produce various color points. The operating conditions for the LED array may be equally as diverse as the array's application, such operating conditions requiring, e.g., low power, high operating temperature, and fast LED activation and deactivation times.

Typically, each LED array is powered by a driver circuit operable in one of several different driving modes depending upon the desired light effect. The LED driver circuit may be driven in a constant current mode, whereby the LED array is supplied a constant current to provide light at a constant intensity. The LED driver may also operate in a variable current mode, whereby the LED array is supplied a varying current to produce a varying intensity of light. The LED driver may also operate in a pulse width modulation (PWM) mode, whereby the LED array is supplied a using a PWM current waveform in which the on period of the PWM waveform determines the time period over which the LED array is activated. The PWM mode may be implemented with either the constant current mode or the varying current mode to provide a combination of each of these attributes, i.e., constant or varying light intensity.

Unfortunately, a large number of circuit components are needed to provide the aforementioned functionality. For example, when a constant current, PWM mode of operation is desired, at least one current source for the LED array and one switch for each LED in the array are typically required. In the case in which a varying current mode of operation is desired, a complex current source operable to quickly change current levels is required. In the case in which a varying current, PWM mode of operation is desired, a complex current source and one switch per LED within the array is usually required.

A high part count for operation and control of the LED array degrades LED performance in a number of ways, each component increasing power consumption of the LED array and contributing parasitic effects which operate to reduce activation and deactivation times of the LEDs. Furthermore, when the LED array is implemented in a high temperature application, each component will require a high temperature rating, a capability that further increases the cost for each required component. Acknowledgement of the problems associated with high part count LED drivers can be seen in U.S. Pat. No. 5,736,881 to Ortiz disclosing an PWM LED driver and LED array configuration in which one current source is used to control multiple LED strings.

SUMMARY OF THE INVENTION

Accordingly, it may be desirable to provide a light emitting array and method of operation which can provide control of separate light emitting elements within an array, and which requires fewer circuit components.

This and other aspects of the invention may be achieved in accordance with the independent claims of the present invention.

In one embodiment of the invention, a light emitting array is described and includes first, second and third light emitting elements, and first and second current sources. The first light emitting element includes first and second terminals, and is characterized by a first operating voltage $V_{OP1}$ at or above which it is substantially operable to emit light. The second light emitting element includes a first terminal, and a second terminal coupled to the second terminal of the first light emitting element, the second light emitting element characterized by a second operating voltage $V_{OP2}$ at or above which the second light emitting element is substantially operable to emit light. The third light emitting element includes a first terminal coupled to the first terminal of the first light emitting element, and a second terminal, the third light emitting element characterized by a third operating voltage $V_{OP3}$ at or above which it is substantially operable to emit light. The first current source is coupled between the first terminal of the first light emitting element and the first terminal of the third light emitting element, and the second current source is coupled between the second terminal of the first light emitting element and the second terminal of the second light emitting element.

In another embodiment of the invention, a method for operating a light emitting array is presented, the light emitting array including the aforementioned first, second and third light emitting elements, the first and second current sources, a first power supply rail coupled to the first terminal of the second light emitting element, and a second power supply rail coupled to the second terminal of the third light emitting element. The method includes the operations of activating the first light emitting element in which the first current source is controlled to output a first current $I_1$, and the second current source is controlled to output a second current $I_2$. The first and second currents $I_1$ and $I_2$ output by the first and second current sources supplies the first light emitting element with current sufficient to achieve at least a first operating voltage $V_{OP1}$ at which point the first light emitting element becomes substantially operable to emit light.

In a third embodiment, an light emitting device is described and includes the light emitting array as described above and herein, as well as a power supply and a controller. The power supply includes a first output coupled to a first power supply rail and a second output coupled to a second power supply rail. The controller includes a first output coupled to the first current source and a second output coupled to the second current source, whereby the first output provides a first control signal to control the current supply of the first current source, and the second output provides a second control signal to control the current supply of the second current source.

It may be seen as a gist of an exemplary embodiment of the present invention that two current sources are arranged to control activation of three light emitting elements, thereby reducing the number of current sources below the 1:1 ratio of current sources to light emitting elements controlled therewith. In this manner, the component count for a light emitting array, such as an LED array, can be reduced, providing a faster, more power efficient, and lower cost light emitting device.

The following describes exemplary features and refinements of the light emitting array, although these features and refinements will apply to the light emitting device, and method of operating the light emitting array as well. In one embodiment of the invention, the light emitting array includes a fourth light emitting element having a first terminal coupled to a power supply rail and a second terminal coupled to either (i) a common node of the first terminal of the first current source and the first terminal of the second light emitting element, or (ii) a common node of the second terminal of the second current source and the second terminal of the third light emitting element. The fourth light emitting element is concurrently activated during activation of any of the first, second or third light emitting elements.

In another embodiment, the first light emitting element includes at least one light emitting diode, and each of the second and third light emitting elements includes at least one additional light emitting diode as included within the first LED circuit, and/or is composed of a different semiconductor material than the at least one light emitting diode included within the first LED circuit. These configurations are arranged to result in the second and third LED circuits having a higher forward voltage than the first LED circuit in accordance with the invention.

In a further embodiment, the light element array includes an energy storage element coupled to one of more of the light emitting elements, e.g. a shunt capacitance coupled across at least one of the first, second, or third light emitting elements. The assigned energy storage may be used to provide continuous illumination of a particular light emitting element for a period of time, or to permit concurrent illumination of two or more light emitting elements.

In a further embodiment, each of the first, second and third light emitting elements is comprised of a element selected from the group consisting of a light emitting diode, an organic light emitting diode, an AC light emitting diode, a laser diode or an incandescent light.

Further exemplary, the first current source is composes of a transistor having a port coupled to a first power supply rail via a resistor, and the second current source is composed of a transistor having a port coupled to a second power supply rail via a second resistor.

Still further exemplary, the first current source is composes of a transistor having a dedicated current amplification factor coupled to a first power supply rail, and the second current source is composed of a transistor having a dedicated current amplification factor coupled to a second power supply rail.

Still further exemplary, the first operating voltage of the first light emitting element is less than each of the second operating voltage of the second light emitting element, and the third operating voltage of the third light emitting element.

The following describes exemplary features and refinements of the method for operating the light element array, although these features and refinements will apply to the light element array and light element device as well. In a particular embodiment, operation of the light emitting array includes activating the second light emitting element, whereby the first current source is controlled to output substantially zero current, and the second current source is controlled to output a third current $I_3$. In this embodiment, the third current $I_3$ is supplied to the second light emitting element, and is sufficient to achieve at least a second operating voltage $V_{OP2}$ thereacross, at which point the second light emitting element becomes substantially operable to emit light.

Further exemplary, the method of operation includes activating the third light emitting element, whereby the first current source is controlled to output a fourth current $I_4$, and the second current source is controlled to output substantially zero current. In this embodiment, the fourth current $I_4$ is supplied to the third light emitting element and is sufficient to achieve at least a third operating voltage $V_{OP3}$ thereacross, at which point the third light emitting element becomes substantially operable to emit light.

Further exemplary, the method of operation includes activating non of the light emitting elements, whereby the first current source is controlled to output substantially zero current, and the second current source is controlled to output substantially zero current. In this embodiment, no current is supplied to either of the light emitting elements and thus no light output is produced Further exemplary of the method of operating the light element array, the first current source includes a first current source transistor coupled to a first power supply rail through a first predefined resistance $R_1$, and the second current source includes a second current source transistor coupled to a second power supply rail through a second predefined resistance $R_2$. In such an arrangement, the aforementioned operation of controlling the first current source to output a first current $I_1$ includes the operations of applying a voltage $V_i$ between a control terminal of the first current source transistor and the first power supply rail to output said first current $I_i$. Further, the aforementioned operation of controlling the second current source to output a second current $I_2$ includes the operation of applying a voltage $V_2$ between a control terminal of the second current source transistor and the second power supply rail to output said first current $I_2$. Further exemplary, the aforementioned operation of controlling the second current source to output a third current $I_3$ includes the operation of applying a voltage $V_3$ between the control terminal of the second current source transistor and the second power supply rail to output said third current $I_3$. Additionally, the operation of controlling the first current source to output a fourth current $I_4$ includes the operation of applying a voltage $V_4$ between the control terminal of the first current source transistor and the first power supply rail to output said fourth current $I_4$.

Still further exemplary of the method of operating the light element array, the first current source includes a first current source transistor having a current gain $\beta_f$ and coupled to a first power supply rail and to the first and third light emitting elements, and the second current source having a current gain of $\beta_j$ and coupled to a second power supply rail and to the first and second light emitting elements. In such an arrangement, the aforementioned operation of controlling the first current source to output a first current $I_1$ includes the operation of sinking a current $I_1/\beta_{i1}$ from a control terminal of the first current source transistor to output said first current $I_1$. Further exemplary, the aforementioned operation of controlling the second current source to output a second current $I_2$ includes the operation of supplying a current $I_2/\beta_{j2}$ to a control terminal of the second current source transistor to output said second current $I_2$. The aforementioned operation of controlling the second current source to output a third current $I_3$ includes the operation of supplying a current $I_3/\beta_{j3}$ to a control terminal of the second current source transistor to output said third current $I_3$. Further exemplary, the operation of controlling the first current source to output a fourth current $I_4$ includes the operation of sinking a current $I_4/\beta_{i4}$ from a control terminal of the first current source transistor (142) to output said fourth current $I_4$.

The operations of the foregoing methods may be realized by a computer program, i.e. by software, or by using one or more special electronic optimization circuits, i.e. in hardware, or in hybrid/firmware form, i.e. by software components and hardware components. The computer program may be implemented as computer readable instruction code in any suitable programming language, such as, for example, VHDL, assembler, JAVA, C++, and may be stored on a computer-readable medium (removable disk, volatile or nonvolatile memory, embedded memory/processor, etc.), the instruction code operable to program a computer or other such programmable device to carry out the intended functions. The computer program may be available from a network, such as the WorldWideWeb, from which it may be downloaded.

These and other aspects of the present invention will become apparent from and elucidated with reference to the embodiment described hereinafter.

DETAILED DESCRIPTION OF THE PREFERRED EMBODIMENTS

Figure 1:
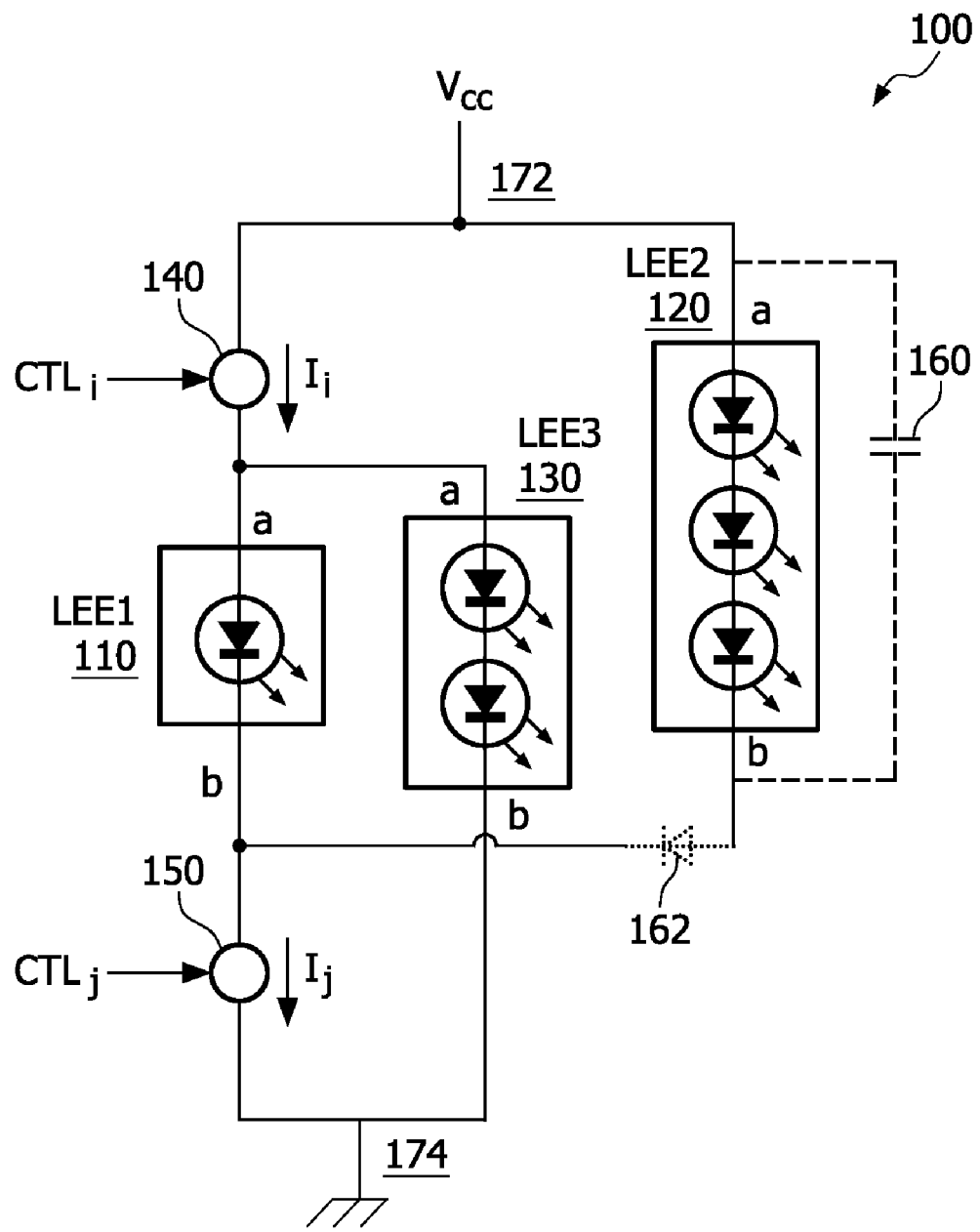
FIG. 1 illustrates an exemplary embodiment of a light element array in accordance with the present invention.

FIG. 1 illustrates an exemplary embodiment of a light element array 100 in accordance with the present invention. The array 100 includes a first light emitting element (LEE) 110 having a first terminal 110a and a second terminal 110b. The array 100 further includes a second LEE 120 having a first terminal 120a adapted for coupling to a first power supply rail 172 (exemplary shown as $V_{cc}$), and a second terminal 120b which is coupled to the second terminal of the first LEE 110. The array 100 further includes a third LEE circuit 130 having a first terminal 130a coupled to the first terminal 110a of the first LEE circuit 110, and a second terminal 130b, adapted for coupling to second power supply rail 174 (exemplary shown as ground potential). As used herein, the term "light emitting element" or "LEE" refers to any light emitting element, circuit, device or component, including light emitting diodes (LEDs), organic light emitting diodes (OLEDs), AC LEDs, laser diodes, or any other lighting element, such as incandescent light and the like.

The array 100 further includes first and second current sources 140 and 150, the first current source 140 coupled between the first terminal 110a of the first LEE 110 and the first terminal 120a of the second LEE 120, and the second current source 150 coupled between the second terminal 110b of the first LEE 110, and the second terminal 130b of the third LEE 130. As can be observed, the array 100 includes one LEE coupled between the first and second current sources 140 and 150. LEE 110 is coupled between the first and second current sources 140 and 150, and the anodes of LEE 110 and 130 are commonly-coupled to the output of the first current source 140, and the cathodes of LEE 110 and 120 are commonly-coupled to the input of the current source 150.

Optionally, the array 100 includes a storage element coupled to provide energy to one or more of the LEEs 110, 120 and 130. In the exemplary embodiment shown, a capacitor 160 is coupled across second LEE 120, the parallel-connection of capacitor 160 and LEE 120 coupled in series with a decoupling element 162. The decoupling element is exemplary shown as a non-light emitting diode, a Schottky diode with low forward voltage drop. Alternatively, the use of a light emitting element is possible. The purpose of the decoupling element is to prevent discharge of the capacitor 160 during activation of the first or third LEEs 110 or 130. The capacitor 160 is operable to provide power to the second LEE 120 during periods which the current sources 140 or 150 do not supply it with current, as will be further described below. In another embodiment, the storage element may be an inductor coupled in series with one or more of the LEE 110, 120 and 130.

In a specific embodiment of the invention, the first, second, and third LEEs 110, 120, and 130 are substantially operable at different bias conditions, e.g., different operating voltages. Specifically, the first LEE 110 is characterized by a first voltage at or above which the first LEE 110 is substantially operable to emit light. Similarly, the second LEE 120 is characterized by a second voltage at or above which the LEE 120 is substantially operable to emit light, and the third LEE 130 is characterized by a third voltage at or above which it is substantially operable to emit light. Further particularly, the first operating voltage $V_{OP1}$ is lower than the second or third forward voltages $V_{OP2}$ and $V_{OP3}$ corresponding to the second and third LEEs 120 and 130. This arrangement provides selectivity in activating the LEEs 110, 120, and 130, as will be further illustrated below.

In one exemplary embodiment, the LEEs 110, 120 and 130 are circuits, each of which include at least one light emitting diode. In such an embodiment, each LEE 110, 120, 130 may employ a plurality (i.e., 2, 3, 5, 10, or more) of serial-coupled diodes, parallel-coupled diodes, or a combination of serial and parallel coupled diodes. Furthermore, different materials may be employed to fabricate the light emitting diodes, for example, Gallium-Nitride, Gallium-Phosphide, or other materials.

In one embodiment of the invention, the first operating voltage $V_{OP1}$ of the first LEE 110 is less than each of the second operating voltage $V_{OP2}$ of the second LEE 120, and the third operating voltage $V_{OP3}$ of the third LEE 130. This difference in operating voltages between the LEEs may be accomplished through a variety of means. For example, in the embodiment in which the LEEs 110, 120 and 130 are LED circuits, the second and third LED circuits 120 and 130 may include at least one additional series-coupled light emitting diode in comparison with the light emitting diodes of the first LED circuit 110. In another example, different semiconductor materials and/or processes may be used to fabricate the light emitting diodes within the first LED circuit 110 to have a lower forward voltage compared to the forward voltages of the light emitting diodes within the second and third LED circuits 120 and 130. In another example, additional circuit components (resistive divider, etc.) may be used to provide the second and third LED circuits 120 and 130 with higher forward voltages compared to the first LED circuit 110. Those skilled in the art will appreciate that a variety of techniques may be used to impart a higher forward voltage to the second and third LED circuits 120 and 130 in comparison to the first LED circuit 110.

The second and third forward voltages $V_{FLED2}$ and $V_{FLED3}$ for corresponding LED circuits 120 and 130 may be different, or they may be substantially the same. Differences in the forward voltages may be achieved through the aforementioned techniques of employing a different number of light emitting diodes and/or a different series or parallel arrangement, of by using different semiconductor materials, for example.

Furthermore, the voltage difference between first and second power supply rails 172 and 174 may be a constant value. Further alternatively, the power supply rails 172 and 174 may be provided a time-varying voltage, e.g., being a rectified voltage derived direct or via a transformer from mains, or being a pulse width modulated (PWM) voltage waveform, or a voltage waveform which includes an intermittent boosted voltage value, as will be further described below.

From the foregoing it will be understood that each control signal $CTL_i$ and $CTL_j$ is operable to control the supply current $I_i$ and $I_j$ of the first and second current sources 140 and 150. It will be appreciated as well that each control signal $CTL_i$ and $CTL_j$ can control the amplitude of the supplied currents $I_i$ and $I_j$. The amplitude of the supplied currents can be controlled to activate a selected one of the LED circuits 110, 120 and 130. The amplitude of the currents $I_i$ and $I_j$ may change over time to control the duration over which the selected LED circuit is activated and the level of light output being produce by the LED circuit. Control of the supplied currents' amplitude over time can be applied to provide a combination of effects.

These embodiments are further described below.

Figure 2:
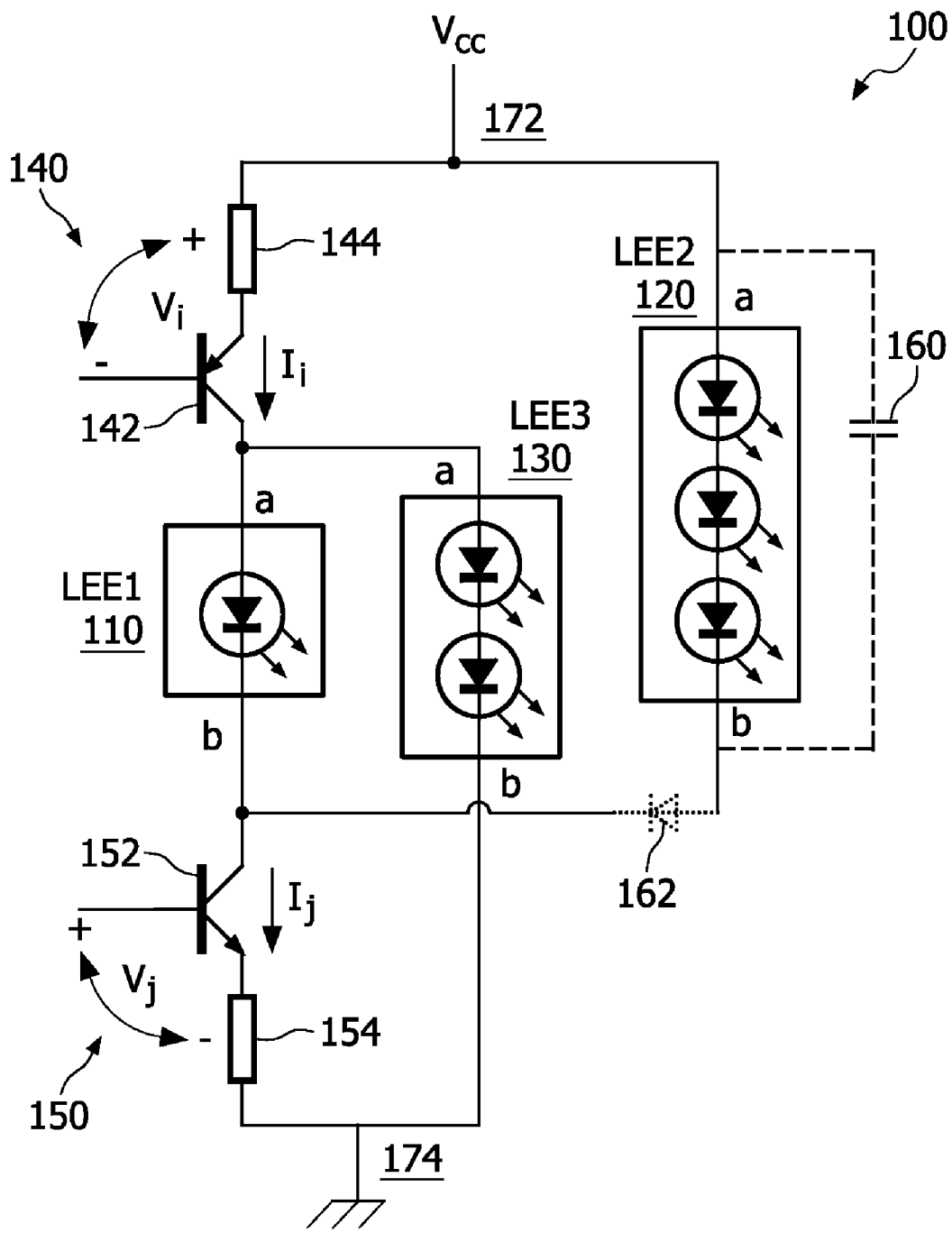
FIG. 2 illustrates a first exemplary implementation of the light element array shown in FIG. 1 in accordance with the present invention.

FIG. 2 illustrates a first exemplary implementation of the light element array 100 shown in FIG. 1 in accordance with the present invention, with previously identified features retaining their reference indicia. As shown, the first and second current sources 140 and 150 are realized as voltage-controlled current sources, each current source including a transistor with emitter degeneration. The emitter resistance may be monolithically formed as a part of the transistor structure itself, be added externally to the transistor structure, or a combination of both approaches in which emitter resistance is used in combination with an externally-coupled resistor.

As illustrated, first current source 140 includes a PNP transistor 142 having a port (emitter terminal) coupled to the first power supply rail ($V_{CC}$) via a first predefined resistor $R_1$. First control signal $CTL_i$ is applied as a voltage $V_i$ developed across the control (base) terminal of the first current source transistor 142 and the first power supply rail 172. Accordingly, the current output $I_i$ from current source 140 can be determined as a function of voltage $V_i$:

$$I_i = \frac{V_i - 0.7\,V}{R_1}$$

where current source transistor 142 has a characteristic base-emitter junction voltage drop of 0.7V, $R_1$ represents the value of the first emitter resistance 144, $V_i$ is the voltage developed across the base terminal of transistor 142 and the first power supply rail 172, and $I_i$ is the controlled current output of the current source 140. First resistor $R_1$ operates as a current sensing element, and voltage $V_i$ is adjustable to provide the desired current $I_i$. In this manner, current supply 140 may be controlled to supply a desired current output $I_i$, even if the supply is unregulated. In addition, the voltage of the first control signal $CTL_1$ can be varied dynamically to provide the necessary $V_i$ voltage, such that the desired $I_i$ is maintained.

Second current source 150 is configured similar to current source 140, and includes an NPN transistor 152 having a port (emitter terminal) coupled to the second power supply rail (shown as ground potential) via a second predefined resistor $R_2$. Controlled output current $I_j$ is determinable in a manner similar to $I_i$, whereby the second control signal $CTL_J$ is applied as a voltage $V_j$ between the base terminal of the second current source transistor 152 and the second power supply rail 174. The current output $I_j$ from current source 150 can be determined as a function of voltage $V_j$:

$$I_j = \frac{V_j - 0.7\,V}{R_2}$$

where the second current source transistor 152 has a characteristic base-emitter junction voltage drop of 0.7V, second resistor $R_2$ represents the value of the emitter resistance 154, $V_j$ is the voltage between the base terminal of the transistor 152 and the second power supply rail 174, and $I_j$ is the controlled current output of the current source 150. Second resistor $R_2$ operates as a current sensing element, and voltage $V_j$ is adjustable to provide the desired current $I_j$. The voltage $V_j$ can be varied dynamically to prevent a runaway current condition when the LEEs begin heating.

It will be understood from the foregoing that different $V_i$ voltages can be provided to obtain different supply currents $I_i$ for the first current source 140, and that different $V_j$ voltages can be provided to obtain different supply currents $I_j$ for the second current source 150. Different combinations of the supplied currents $I_i$ and $I_j$ can be used to selectively activate each of the LEEs 110, 120 and 130, depending upon the operating voltage of each LEE. Exemplary embodiments of these processes are further detailed below.

While the first and second current sources 140 and 150 are illustrated as PNP and NPN transistors respectively, those skilled in the art will appreciate that either current source may be realized as either a PNP or NPN transistor, as a MOSFET transistor, a JFET transistor, an operational amplifier, and other similar structures.

Figure 3:
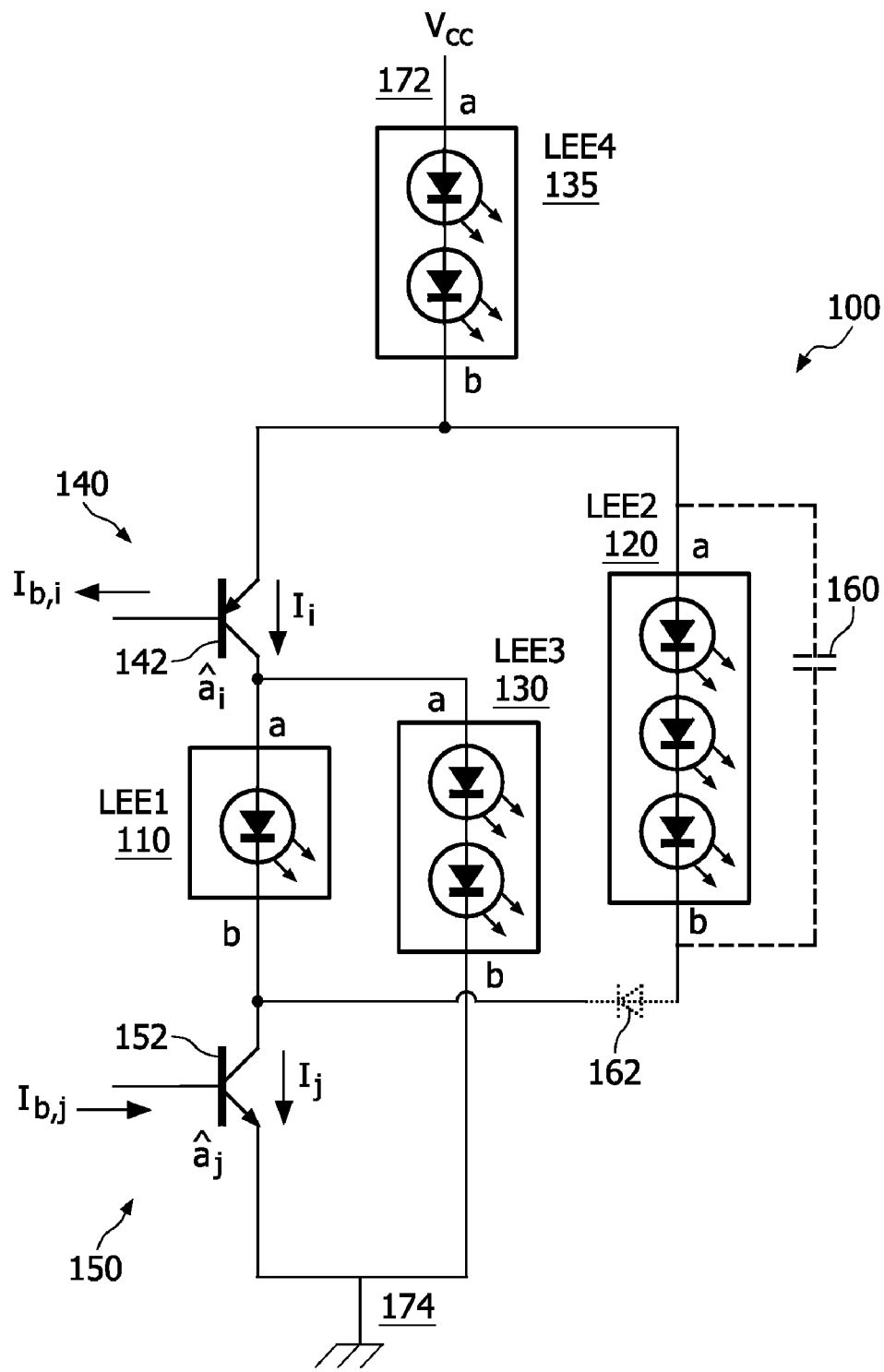
FIG. 3 illustrates a second exemplary implementation of the light element array shown in FIG. 1 in accordance with the invention.

FIG. 3 illustrates a second embodiment of a light element array 100 in accordance with the invention, with previously identified features retaining their reference indicia. In this embodiment, the array 100 includes a fourth LEE 135 interposed between the first power supply rail 172 and the first current source 140, the fourth LEE 135 having a fourth operating voltage $V_{OP4}$ at or above which it is substantially operable to emit light. In the illustrated embodiment, the fourth LEE 135 includes a first terminal 135a coupled to the first power supply rail 172 and a second terminal 135b coupled between the first power supply rail 172 and a common node of the first (emitter) terminal of the first current source transistor 142 and the first terminal of the second LEE 120. Because of its series configuration with the first, second and third LEEs 110, 120, 130 the fourth LEE 135 will provide light emission during activation of any of the first, second and third LEEs 110, 120, and 130. Such an arrangement may be beneficial in providing a particular light output when two LEEs are needed to provide such a light output. The skilled person will appreciate that the fourth LEE 135 can be alternatively coupled between the second power supply rail 174 and a common node of the second (emitter) terminal of the second current source transistor 152 and the second terminal of the third LEE 130.

As shown, first and second current sources 140 and 150 are current-controlled current sources. Exemplary of this embodiment, first and second current sources 140 and 150 include first and second current source transistors 142 and 152, respectively, the first and second current source transistors 142 and 152 having current gain factors $\beta_i$ and $\beta_j$ representing the ratio of the transistor's collector current to its base current. The first current source transistor 142 includes a port (emitter terminal) which is coupled to a first power supply rail 172 and to the first and third light emitting elements 110, 130, and the second current source transistor 152 includes a port (emitter terminal) which is coupled to a second power supply rail 174 and to the first and second light emitting elements 110, 120.

In this embodiment, first control signal $CTL_i$ is a base current $I_{b,i}$ operable to control/limit transistor 142 to supply the desired current $I_i$ from its collector terminal via its current gain factor $\beta_i$:

$$I_i = \beta_i \cdot I_{b,i}$$

Similarly, second control signal $CTL_j$ is a base current $I_{b,j}$ operable to control/limit transistor 152 to supply the desired current $I_j$ at its collector terminal via its current gain factor $\beta_j$:

$$I_j = \beta_j \cdot I_{b,j}$$

Depending on the type of transistor selected for the current sources, the current gain factors $\beta_i$ and $\beta_j$ may be different for the two current sources and may even depend on the operation conditions of the current sources.

Operation of the current sources as current amplifiers provides benefits in that the emitter resistors 144 and 154 are not necessary resulting in lower power dissipation and circuit operation at a lower supply voltage. This embodiment is also advantageous in that voltage errors present along the base lines of the current source transistors 142 and 152 or power supply lines (perhaps due to long lead length, ohmic loss, etc.) can be avoided.

In a specific embodiment of the invention, bypass elements, such as resistors, are parallel-coupled with the second and the third LEEs 120 and 130 to dissipate erroneous levels of current supplied thereto, e.g. when the first and second current sources do not supply the same level of current although they are expected to supply the same current. In this case, no light output from the second and the third LEE is desired and the bypass elements can be used to prevent light output from the second and third LEE. These bypass elements may selectively be switched in to carry current surplus current supplied to one or more of the unselected LEEs such that the unselected LEEs would not be biased sufficient to a level in which light output is produced. In such an embodiment, the errors during intended activation of the second and the third LEEs 120 and 130 caused by the bypass elements can be taken into account when designing the system.

Figure 4:
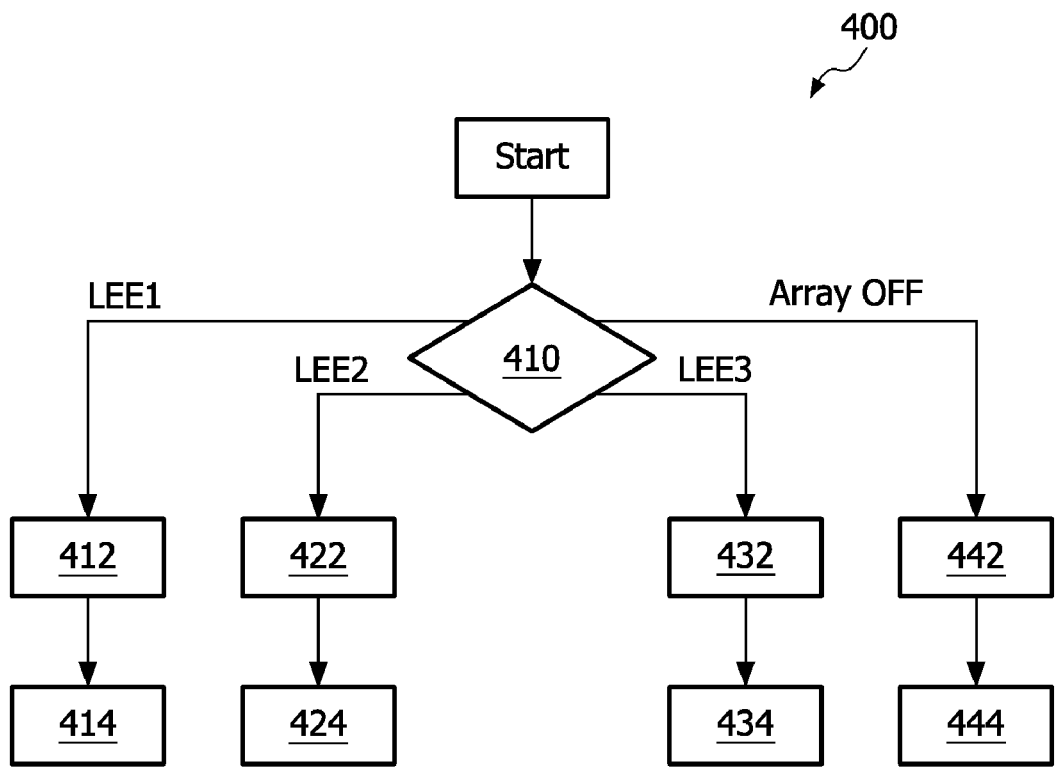
FIG. 4 illustrates a method for operating the light element array shown in FIG. 1 and corresponding state table in accordance with the present invention.

FIG. 4 illustrates an exemplary method 400 and corresponding state table 480 describing operation of the light emitting array 100 in accordance with the present invention. Initially at 410, a determination is made as to which state the array 100 is to operate. If the array 100 is to operate in state "1" in which the first LEE 110 emits light, the process continues at 412, whereby the first current source 140 is controlled to supply a first current $I_1$, and at 414, where the second current source 150 is controlled to supply a second current $I_2$. This operation provides current to the first LEE 110 at a level which produces a operating voltage $V_{OP1}$ across the first LEE 110, thereby rendering the first LEE 110 substantially operable to emit light. In an exemplary embodiment of the invention, the voltages applied to the second and the third LEEs are significantly below their operation voltages $V_{OP2}$ and $V_{OP3}$ that substantially no current will flow through the second and third LEEs, hence no light is produced by the second and the third LEEs. In a particular embodiment, the first and second currents $I_1$ and $I_2$ are substantially the same, this current level consumed via the first LEE 110, and accordingly no current is supplied to either of the second and third LEEs 120 and 130. In another embodiment, the two supplied currents $I_1$ and $I_2$ are different, e.g., when one or both of the second or third LEEs 120, 130 draws current, e.g., leakage current. In such an embodiment, the level of current drawn by one or both of the second and/or third LEEs 120, 130 depends on the current difference supplied from the two current sources. In a specific embodiment in which light from the second and the third LEE is undesired, the aforementioned bypass elements (e.g., fixed or variable resistor 530, FIG. 5) can be used to consume this current.

In another embodiment, the currents supplied by the two current sources are set to different values, both values being different from zero. In this case, two or more LEEs might emit light at the same time. The level of light output emitted by each LEE depends on the ration of the currents.

If the array 100 is selected to operate in state "2" in which the second LEE 120 emits light, the process continues at 422, whereby the first current source 140 is controlled to supply substantially zero current, and the second current source 150 is controlled to supply a third current $I_3$ (operation 424). The output current $I_3$ is supplied to the second LEE 120 and is sufficient to produce at least an operating voltage $V_{OP2}$ across the second LEE 120, thereby rendering the second LEE 120 substantially operable to emit light. As the first current source 140 is controlled to output substantially zero current, the first and third LEEs 110 and 130 are largely deactivated.

If the array 100 is selected to operate in state "3" in which the third LEE 130 emits light, the process continues at 432, whereby the first current source 140 is controlled to supply a fourth current $I_4$, and the second current source 150 is controlled to output substantially zero current (434). The output current $I_4$ is supplied to the third LEE 130 and is sufficient to produce at least a forward voltage $V_{OP3}$ across the third LEE 130, thereby rendering the third LEE 130 substantially operable to emit light. As the second current source 150 is controlled to output substantially zero current, the first and second LEEs 110 and 120 are largely deactivated.

If the array 100 is selected to operate in state "4" in which each of the first, second and third LEEs 110, 120 and 130 are substantially deactivated, the first and second current sources 140 and 150 are controlled to output substantially zero current. Minimal or no current is supplied to each of the first, second and third LEEs 110, 120, and 130, and as such, none are biased at or above their respective operating voltages $V_{OP1}$, $V_{OP2}$, $V_{OP3}$, each is largely deactivated.

In exemplary embodiments consistent with the array of FIG. 2, operation 412 may be performed by applying a first control voltage $V_1$ between the base terminal of transistor 142 and the first power supply rail 172, voltage $V_1$ controlling the first current source transistor 142 to produce the first current $I_i$. Operation 414 may be similarly performed by applying a second control voltage $V_2$ between the base terminal of transistor 152 and the second power supply rail 174, voltage $V_2$ controlling the second current source transistor 152 to produce the second current $I_2$. Operation 422 of controlling the first current source 140 to supply substantially zero current may be performed by decreasing voltage $V_i$ towards zero.

Operation 424 may be performed by applying a third control voltage $V_3$ between the base terminal of transistor 152 and the second power supply rail 174, voltage $V_3$ controlling the second current source transistor 152 to supply the third current $I_3$. Operation 432 may be performed by applying a fourth control voltage $V_4$ across the base terminal of transistor 142 and the first power supply rail 172, voltage $V_4$ controlling the first current source transistor 142 to produce the fourth current $I_4$. Operation 434 of controlling the second current source 150 to conduct substantially zero current may be performed by lowering voltage $V_j$ towards zero. Operation 442 of controlling the first current source 140 to conduct substantially zero current may be performed by decreasing voltage $V_i$ towards zero, and operation 444 of controlling the second current source 150 to conduct substantially zero current may be performed by lowering voltage $V_j$ towards zero.

In exemplary embodiments consistent with the array of FIG. 3, operation 412 may be performed by sinking a first control current≈$I_1/\beta_{i1}$ from the base junction of first current source transistor 142, thereby producing the first current $I_1$. Operation 414 may be similarly performed by supplying a second control current≈$I_2/\beta_{j2}$ into the base junction of second current source transistor 152, thereby producing the second current $I_2$. Operation 422 may be performed by supplying substantially zero current to the base junction of the first current source transistor 152. Operation 424 may be performed by supplying a third control current≈$I_3/\beta_{j3}$ to the base junction of second current source transistor 152, thereby producing the third current $I_3$. Operation 432 may be performed by sinking a fourth control current≈$I_4/\beta_{i4}$ from the base junction of first current source transistor 142, thereby producing the fourth current $I_4$. Operation 434 may be performed by sinking substantially zero current from the base junction of the second current source transistor 152. Operation 442 may be performed by sinking substantially zero current from the base junction of the first current source transistor 142. Operation 444 may be performed by supplying substantially zero current to the base junction of the second current source transistor 152.

From the foregoing, the following operating voltage relationships of the first, second and third LEEs can be seen:

$$V_{OP1} < V_{OP2}, V_{OP3}$$

The operating voltage difference is preferably selected also in accordance with the supply voltage.

The operating voltage corresponding to the first LEE 110 is the lowest among the first, second and third LEEs 110, 120, and 130, the first LEE 110 corresponding to the LEE which is activated when both current sources 140 and 150 are controlled to provide an output current. The operating voltages corresponding to the second and third LEEs 120 and 130 are higher voltage levels, and correspond to the LEEs which are supplied current using one of the two current sources 130 or 140 or both current sources when substantially different current at set for both current sources. When employed, the fourth LEE 135 has a characteristic operating voltage $V_{OP4}$. The operating voltage of the fourth LEE may have any desired value.

By way of example and not limitation, the first, second and third LEEs 110, 120 and 130 are formed as light emitting diode circuits, the first LED circuit 110 operable to emit red light. Due to a serial connection of several red LEDs, the nominal forward voltage of the first LED circuit 110 is 5.7 V at a nominal current of 350 mA. The LEDs of the second LED circuit 120 emit green light. Due to a mixed serial and parallel connection of several green LEDs, the nominal forward voltage of the second LED circuit 120 is 20.5 V at a nominal current of 700 mA. The LEDs of the third LED circuit 130 emit blue light. Due to a serial connection of several blue LEDs, the nominal forward voltage of the third LED circuit 130 is 20.5 V at a nominal current of 350 mA.

The supply voltage for the device may be selected to 23 V in this particular exemplary embodiment. To activate the first LED circuit 110 to approximately half of its nominal optical output, the first current source 140 is set to deliver a current of 175 mA and the second current source 150 is set to deliver a current of 175 mA. This current will flow trough the first LED circuit 110 activating the first LED circuit 110 to emit light. The operating (i.e. forward) voltage of the first LED circuit 110 at that particular current value might be in the range of 5 V. Assuming the same characteristics for the first and the second current sources 140 and 150, the voltage across the first current source 140 is 9 V. The same value of 9 V will be present as voltage across the second current source 150. Thus, the voltage applied across both the second and the third LED circuits 120 and 130 will be 14 V. At this voltage level, the second and third LED circuits 120 and 130 will draw no significant current, since their nominal voltage is 20.5 V. Thus, there will be no light output from the second and the third LED circuits 120 and 130 and only the red LEDs in the first LED circuit 110 will emit light in that mode of operation.

To activate the second LED circuit 120 to produce its nominal optical output, the first current source 140 is set to deliver no output current and the second current source 150 is set to deliver an output current of 700 mA. This current of 700 mA will flow through the second LED circuit 120, thereby activating the second LED circuit to emit light. There is no current fed into the first or the third LED circuits 110 and 130, thus neither will provide any light output. Accordingly, only the green LEDs in the second LED circuit 120 will emit light in that mode of operation.

In case the third LED circuit is to be activated to produce approximately 60% of its nominal optical output, the first current source 140 is set to deliver an output current of 210 mA and the second current source 150 is set to deliver no output current. The current of 210 mA will flow through the third LED circuit 130, thereby activating the third LED circuit to emit light. There is no current fed into the first or the third LED circuits 110 and 120, thus neither will provide any light output. Accordingly, only the blue LEDs in the third LED circuit will emit light in that mode of operation. The foregoing example represents only one example of an implementation covered under the present invention, and those skilled in the art will appreciate that other light emitting elements biased at different operating conditions may be alternatively employed in other embodiments of the present invention.

Figure 5:
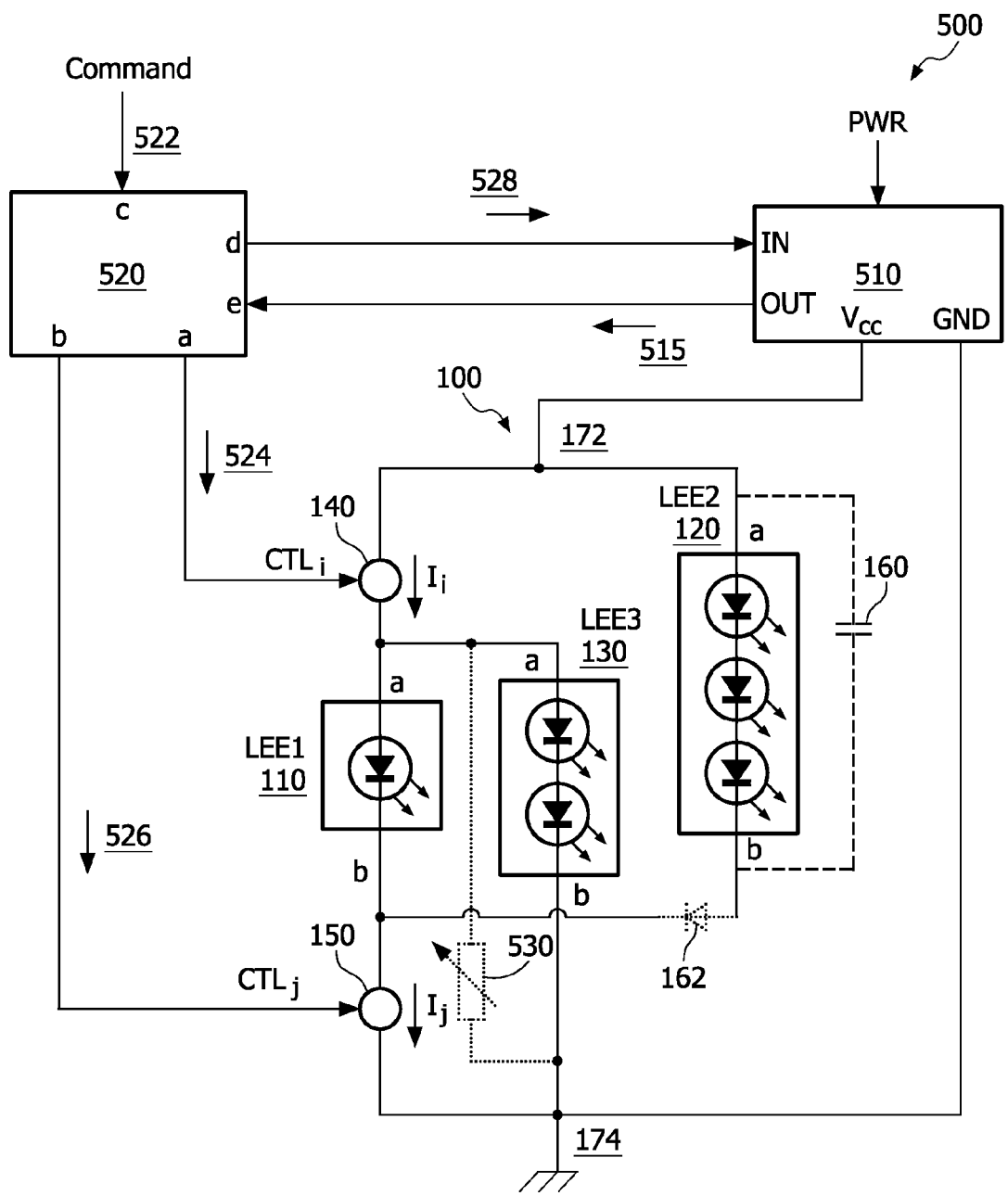
FIG. 5 illustrates a light element device incorporating the light element array of FIG. 1 in accordance with the present invention.

FIG. 5 illustrates a light emitting device 500 incorporating the light emitting array 100 in accordance with the present invention, with previously-described features retaining their reference numerals. In addition to the light emitting array 100, the light emitting device 500 further includes a power supply 510 operable to supply power to the first and second power supply rails 172 and 174, and a current source controller 520.

In the exemplary embodiment shown, the power supply 510 includes high and low rail outputs, indicated as $V_{CC}$ and ground potentials, although in other embodiments the high and low rail outputs may be different as described above. Optionally, the power supply 510 includes an input port IN operable to receive a signal 528 to modify the voltage level output at the VCC output, as will be described in greater below. Further optionally, the power supply 510 includes an output port OUT for providing a feedback signal 515 to the controller 520, the use of which may be operable to control the activation of the LEEs, as described below. As explained above, the power supply 510 may be operable to provide either a regulated or unregulated voltage, as the first and second current sources 130 and 140 are controllable to provide the desired current level, or to limit the current supplied thereby. In an exemplary embodiment, the first power supply rail 172 is provided 23 V DC and the second power supply rail 174 is ground potential, although other voltage levels may be used in different embodiments. Due to the current controlling features of the first and second current sources, the supply voltage may be a regulated or an unregulated voltage. For example, the power supply may be operable to provide a time-varying voltage, for example a PWM voltage waveform synchronized with the operation of the current sources 140 and 150, as further explained below.

The light emitting device 500 further includes a current source controller 520 operable to perform the operations of processes illustrated in FIG. 4, above. The controller 520 includes a first output 520a coupled to the first current source 130 for providing the first control signal 524 ($CTL_i$), and a second output 520b coupled to the second current source 150 for providing the second control signal 526 ($CTL_j$). The first control signal 524 is operable to control the current supply of the first current source 140, and the second control signal 526 is operable to control the current supply of the second current source 150, as described above. The controller 520 may further include an input 520c coupled to receive an LEE activation command 522. Alternatively, the controller may be operated based on pre-defined/pre-loaded settings. Further optionally, the controller includes an output port 520d operable to supply a control signal 528 to the power supply 510, the voltage control signal 528 operable to alter (e.g. increase) the output voltage level of the power supply 510 based upon particular criteria, for example, increased loading of the array 100. Further optionally, the controller includes an input 520e for receiving a feedback signal 515, e.g. the feedback signal 515 providing information as to the current voltage output state of the power supply 510, whereby the controller 520 can intelligently select which of the LEEs can be operated therewith. Details of this operation are further described below.

The current source controller 520 can be made operable to provide first and second control signals 524 and 526 in various forms. For example, in order to obtain constant illumination of the first LEE 110 shown in FIG. 2, controller 520 may be made operable to provide the first control signal 524 as a voltage which results in developing $V_i$ between the base terminal of the first current source transistor 142 and the first power supply rail 172, controller 520 made further operable to provide the second control signal 526 as a voltage which results in developing $V_j$ between the base terminal of the second current source transistor 152 and the second power supply rail 174, as described above. In a similar manner, the power supply 510 may be controlled to vary the level of one or both of the control signal voltages 524 and 526 to effectuate a change in LEE's intensity or luminance. In another embodiment, one or both control signals 524 and 526 are in the form of a pulse width modulated (PWM) signal, operable to control each of the current sources 140 and 150 to supply PWM current waveforms to the LEEs. As known in the art, PWM current waveforms can be used to control the activation period of the LEE, the length of such activation periods determining the LEE's amount of light output.

In a further exemplary embodiment, the LEE array 100 is operable with a shunt capacitance coupled across one or more of the LEE circuits 110, 120 and 130 (LEE circuit 120 illustrating a shunt capacitor 160 in FIG. 5, although several, or all LEE circuits may employ a shunt capacitor 160). Such an arrangement may be used to provide continuous illumination of a particular LEE for a period of time, or to permit concurrent illumination of two or more LEEs, the latter condition arising, for example, when a previously-inactive LEE begins receiving the PWM current waveform, and current to another LEE is discontinued, the decoupled LEE's shunt capacitor providing current to drive its LEE for continued activation.

The size of capacitor 160 coupled to one or more of the LEEs (each of which may be of the same capacitance value or different values) is based upon several factors, including the time period T of the PWM current waveform (when employed), the acceptable magnitude of ripple delivered to the coupled LEE, and the duration of "off state activation," "off state activation" referring to the condition in which the stored charge of shunt capacitor 160 activates the corresponding LEE after current to the LEE is discontinued. As will be appreciated, smaller capacitors can be employed when an applied PWM current waveform includes a shorter time period T, and/or when the off state activation time is shorter, and/or when a larger magnitude of ripple is desired or acceptable. A larger capacitance may be employed in instances in which a longer time period T is provided by an applied PWM current waveform, and/or when a longer off state activation period is sought, and/or when a smaller ripple magnitude in $\bar{I}_{LEE,i}$ is desired or required.

Another factor possibly impacting the size selection for capacitor(s) 160 is the acceptable delay in activating or deactivating the LEEs utilizing shunt capacitor 160. In particular, the size of the capacitor 160 may inhibit how fast a previously-inactive LEE can reach its operating voltage condition $V_{OP}$, or how fast a previously-active LEE can be deactivated. In such circumstances, the rise and fall time transitions between inactive and active states of the PWM current waveform can be degraded beyond an acceptable limit, resulting in erroneous emission of light in some circumstances (delayed deactivation of an LEE), and/or the omission of light in other circumstance (delayed activation of an LEE).

One exemplary approach for minimizing the delayed activation/deactivation effects is to provide an intermittent compensation effect to accelerate the rise and fall time transitions. For example, the rise time transition of a previously-inactive LEE to an active state can be accelerated by providing, for a short period of time, a higher current level to the LEE, thereby charging its shunt capacitor 160 faster and achieving the forward voltage sooner than if the desired current level I is applied constantly over time t during which the particular LEE is active.

Due to the certain voltage-current characteristics of an LEE, with lower operating voltages the current drops. Discharging the capacitor by delivering the energy to the LEE may result in a long time period during which only very little noticeable light is produce by the LEE. Connecting an additional load with appropriate characteristics (e.g. resistor 530 or a serial connection of a resistor and a zener-diode) can be used to accelerate the final off-state of the LEE. In addition, the controller 520 can be programmed in a way to compensate the missing or additional light output from a LEE with a shunt capacitor 160 and can compensate this with respect to the time averaged light output.

Additional process may also be performed to relax loading of the power supply. For example, activation of a particular LEE may be synchronized with the loading conditions of the power supply 510, such that activation of LEEs having a high forward voltage and/or coupled to a large shunt capacitance is timed, when possible, to coincide with low loading conditions of the power supply 510. Along these lines, the power supply 520 may be made operable to provide a time-varying voltage to the first and/or second rails 172, 174, whereby an increased output voltage (e.g., a temporarily boosted voltage, or a PWM voltage waveform) is provided synchronously with a high loading condition. In such an embodiment, the power supply 510 may include a port for receiving a control signal 528 when the controller 520 senses a high loading condition.

Additionally, the activation cycle itself may also be scheduled to the available voltage output of the power supply 510. Using a feedback signal 515, e.g. representing the output voltage of the power supply 510, a suitable LEE my be selected for activation. For example, when using an unregulated power supply which is derived from rectifying a main line voltage, some ripple will be present in the supply voltage. The feedback signal 515 may represent the supply voltage. The activation of the LEE requiring the lowest supply voltage can be synchronised to the time period where the lowest supply voltage is delivered from the power supply 510. Using this method, the overall efficiency of the system may be increased and the costs are reduced It summary it may be seen as one aspect of the present invention that two current source can be arranged to control activation of three light emitting elements, thereby reducing the number of current sources below the 1:1 ratio of current sources to light emitting elements controlled thereby. In this manner, the component count for the light element array can be reduced, providing a faster, more power efficient, and lower cost light emitting device.

As readily appreciated by those skilled in the art, the described processes may be implemented in hardware, software, firmware or a combination of these implementations as appropriate. In addition, some or all of the described processes may be implemented as computer readable instruction code resident on a computer readable medium (removable disk, volatile or non-volatile memory, embedded processors, etc.), the instruction code operable to program a computer or other such programmable device to carry out the intended functions.

It should be noted that the term "comprising" does not exclude other features, and the definite article "a" or "an" does not exclude a plurality, except when indicated. It is to be further noted that elements described in association with different embodiments may be combined. It is also noted that reference signs in the claims shall not be construed as limiting the scope of the claims. The term "coupling" is used to indicate either a direct connection between two features, or an indirect connection, via an intervening structure, between two features. Operations illustrated in flow charts are not limited to the particular sequence shown, and later numbered operations may be performed currently with, or in advance of earlier number operations in accordance with the invention.

The foregoing description has been presented for purposes of illustration and description. It is not intended to be exhaustive or to limit the invention to the precise form disclosed, and obviously many modifications and variations are possible in light of the disclosed teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

The invention claimed is:

1. A light element array, comprising:
   a first light emitting element having a first terminal and a second terminal, the first light emitting element characterized by a first operating voltage (Vop1) at or above which the first light emitting element is substantially operable to emit light;
   a second light emitting element having a first terminal, and a second terminal coupled to the second terminal of the first light emitting element, the second light emitting element characterized by a second operating voltage (Vop2) at or above which the second light emitting element is substantially operable to emit light;
   a third light emitting element having a first terminal coupled to the first terminal of the first light element, and a second terminal, the third light emitting element characterized by a third operating voltage (Vop3) at or above which the third light emitting element is substantially operable to emit light;
   a first current source coupled between the first terminal of the first light emitting element and the first terminal of the second light emitting element; and
   a second current source coupled between the second terminal of the first light emitting element and the second terminal of the third light emitting element.

2. The light element array of claim 1, further comprising a fourth light emitting element (135) having a first terminal coupled to a power supply rail and a second terminal coupled to either (i) a common node of the first terminal of the first current source and the first terminal of the second light emitting element, or (ii) a common node of the second terminal of the second current source and the second terminal of the third light emitting element.

3. The light emitting diode array of claim 1, further comprising a energy storage element coupled to at least one of the first, second, or third light elements.

4. The light emitting array of claim 3, wherein the energy storage element comprises a capacitor coupled in parallel to at least one of the first, second or third light emitting elements.

5. The light emitting array of claim 1, wherein the each of the first, second, or third light emitting elements is selected from a group consisting of: a light emitting diode, an organic light emitting diode, an AC light emitting diode, a laser diode and an incandescent light.

6. The light element array of claim 1, wherein the first light emitting element comprises at least one light emitting diode, and wherein each of the second light emitting element and the third light emitting element comprises at least one additional light emitting diode as included within the first light emitting element, or is composed of a different semiconductor material than the at least one light emitting diode included within the first light emitting element.

7. The light element array of claim 1, wherein the first current source comprises a first current source transistor having a port coupled to a first power supply rail, and wherein the second current source comprises a second current source transistor having a port coupled to a second power supply rail.

8. The light element array of claim 7, wherein the first current source transistor is coupled to the first power supply rail through a first resistor, and wherein the second current source transistor is coupled to the second power supply rail through a second resistor.

9. The light element array of claim 1, wherein the first operating voltage (Vop1) of the first light emitting element is less than each of the second operating voltage (Vop2) of the second light emitting element, and the third operating voltage (Vop3) of the third light emitting element.

10. A light emitting device, comprising:
    the light emitting array as described in claim 1;

a power supply having a first output coupled to a first power supply rail and a second output coupled to a second power supply rail; and a controller having a first output coupled to the first current source and a second output coupled to the second current source, the first output operable to provide a first control signal to control the current supply of the first current source, and the second output operable to provide a second control signal to control the current supply state of the second current source.

11. A method for operating an light element array, the light element array including a first light emitting element having first and second terminals, a second light emitting element having a first terminal coupled to a first power supply rail and a second terminal coupled to the second terminal of the first light element, a third light emitting element having a first terminal coupled to the first terminal of the first light emitting element and a second terminal coupled to a second power supply rail, a first current source coupled between the first terminal of the first light emitting element and the first terminal of the second light emitting element, and a second current source coupled between the second terminal of the first light emitting element and the second terminal of the third light emitting element, the method comprising:

activating the first light emitting element, comprising:

controlling said first current source to output a first current I1; and controlling said second current source to output a second current I2, wherein said first and second currents I1 and I2 output by said first and second current sources supply the first light emitting element with current sufficient to achieve at least a first operating voltage (Vop1) at which point the first light emitting element becomes substantially operable to emit light.

12. The method of claim 11, further comprising:

activating the second light emitting element, comprising:

controlling said first current source to output substantially zero current; and controlling said second current source to output a third current I3, wherein said third current I3 is supplied to the second light emitting element and is sufficient to achieve at least a second operating voltage (Vop2) thereacross, at which point the second light emitting element becomes substantially operable to emit light.

13. The method of claim 11, further comprising:

activating the third light emitting element, comprising:

controlling said first current source to output a fourth current I4; and controlling said second current source to output substantially zero current, wherein said fourth current I4 is supplied to the third light emitting element and is sufficient to achieve at least a third operation voltage (Vop3) thereacross, at which point the third light emitting element becomes substantially operable to emit light.

14. The method of claim 11, wherein the first current source comprises a first current source transistor coupled to a first power supply rail through a first predefined resistance R1 (144), and wherein the second current source comprises a second current source transistor coupled to a second power supply rail through a second predefined resistance R2, wherein controlling said first current source to output a first current I1 comprises applying a voltage V1 between a control terminal of the first current source transistor and the first power supply rail to output said first current I1, wherein controlling said second current source to output a second current I2 comprises applying a voltage V2 between a control terminal of the second current source transistor and the second power supply rail to output said first current I2; and wherein controlling said second current source to output a third current I3 (424) comprises applying a voltage V3 between the control terminal of the second current source transistor and the second power supply rail to output said third current I3.

wherein controlling said first current source to output a fourth current I4 (432) comprises applying a voltage V4 between the control terminal of the first current source transistor 142 and the first power supply rail to output said fourth current I4.

15. The method of claim 11, wherein the first current source comprises a first current source transistor coupled to a first power supply rail and to the first and third light emitting elements (110, 130), the first current source transistor having a first current gain βi, and wherein the second current source comprises a second current source transistor coupled to a second power supply rail and to the first and second light emitting elements (110, 120), the second current source transistor having a second current gain βj, and wherein controlling said first current source to output a first current I1 comprises sinking a current I1/βi1 from a control terminal of the first current source transistor to output said first current I1, wherein controlling said second current source to output a second current I2 comprises supplying a current I2/βj2 to a control terminal of the second current source transistor to output said second current I2, wherein controlling said second current source to output a third current I3 comprises supplying a current I3/βj3 to a control terminal of the second current source transistor to output said third current I3, wherein controlling said first current source to output a fourth current I4 (432) comprises sinking a current I4/βi4 from a control terminal of the first current source transistor to output said fourth current I4.

* * * * *